(12) United States Patent
Perry et al.

(10) Patent No.: US 8,897,434 B2
(45) Date of Patent: Nov. 25, 2014

(54) APPOINTMENT-RELATED COMMUNICATIONS

(75) Inventors: Paul O. Perry, Lexington, MA (US); Robert H. Liao, Chestnut Hill, MA (US); Rezwanul Azim, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1108 days.

(21) Appl. No.: 12/333,409

(22) Filed: Dec. 12, 2008

(65) Prior Publication Data

US 2010/0150330 A1 Jun. 17, 2010

(51) Int. Cl.
*H04M 3/42* (2006.01)
*H04M 3/56* (2006.01)
*H04M 7/00* (2006.01)

(52) U.S. Cl.
CPC ........ *H04M 3/56* (2013.01); *H04M 2203/2072* (2013.01); *H04M 7/003* (2013.01)
USPC ..................................................... 379/202.01

(58) Field of Classification Search
USPC .......... 379/202.01, 204.01; 455/416; 370/260
See application file for complete search history.

(56) References Cited

U.S. PATENT DOCUMENTS

| | | | |
|---|---|---|---|
| 5,842,009 A * | 11/1998 | Borovoy et al. ...................... 1/1 |
| 2005/0094794 A1* | 5/2005 | Creamer et al. ......... 379/202.01 |
| 2006/0187859 A1* | 8/2006 | Shaffer et al. ................. 370/260 |
| 2007/0280464 A1* | 12/2007 | Hughes et al. ........... 379/205.01 |
| 2008/0219426 A1* | 9/2008 | Lai ............................ 379/202.01 |
| 2009/0013045 A1* | 1/2009 | Maes et al. .................... 709/205 |
| 2009/0252308 A1* | 10/2009 | Arsenault et al. .......... 379/93.01 |

* cited by examiner

*Primary Examiner* — Sonia Gay

(57) ABSTRACT

A method may include identifying information stored in an application on a user device. The information may be associated with an appointment-related call. The method may also include forwarding a link to the user device via which a communication session with another party can be established, or automatically dialing a telephone number associated with the appointment-related call.

22 Claims, 6 Drawing Sheets

APPOINTMENT-RELATED COMMUNICATIONS

BACKGROUND INFORMATION

During the course of a work week, a typical worker may have several meetings that are scheduled at various times. Some of the meetings may be live meetings in which a number of workers meet in a conference area. Others ones of the meetings may be teleconferences that require one or more of the meeting attendees to dial into a conference bridge. The conference bridge often requires a party to enter a particular passcode or other identifier before allowing the party to join the teleconference. Keeping track of meeting times, conference bridge telephone numbers, conference bridge passcodes, etc., is often difficult. As a result, parties often miss various meetings/teleconferences or are late to the meetings/teleconferences.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to facilitating access to appointment-related calls, such as teleconferences. For example, information associated with a teleconference may be entered into an application executed by a user device. A network device may access the application stored on the user device and identify teleconference-related information, such as a conference bridge number, passcode, etc. Information may then be provided back to the user device or a telephone device associated with the user device in a form that enables the user to access the teleconference bridge without manually dialing the conference bridge. For example, in one implementation, a link is provided to the user device or a telephone associated with the user device. The user may then access the teleconference by selecting the link. In other implementations, the network device may automatically dial the conference bridge and/or the user's telephone device and bridge the user's device into the conference.

Figure 1:
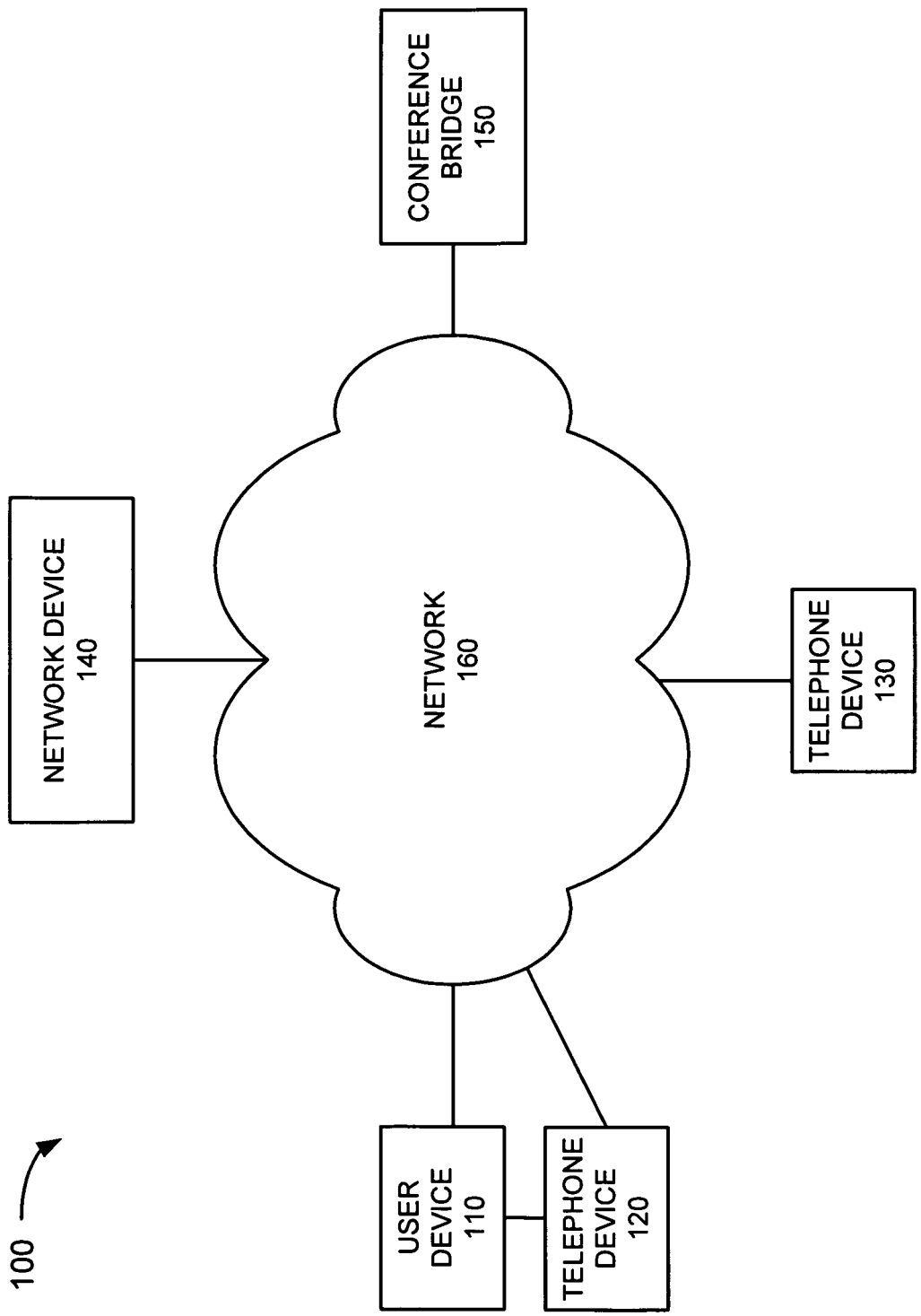
FIG. 1 illustrates an exemplary network in which systems and methods described herein may be implemented.

FIG. 1 is a block diagram of an exemplary network 100 in which systems and methods described herein may be implemented. Network 100 may include user device 110, telephone devices 120 and 130, network device 140, conference bridge 150 and network 160.

User device 110 may include any type of computing device or system, such as a personal computer (PC), a laptop, a personal digital assistant (PDA), etc., that may execute various applications, such as a calendar application. In some implementations, user device 110 may also or alternatively be configured to provide telephone functionality. For example, user device 110 may include a voice over Internet protocol (VoIP) telephone (e.g., a session initiation protocol (SIP)-based telephone). In some implementations, a SIP-based telephone device may include a software client that may run, for example, on a conventional PC, laptop computer or other computing device. In other instances, the SIP-based telephone device may take the form of a standalone device, e.g., a SIP-based telephone designed and configured to function and appear like a conventional telephone. In addition, in some implementation, user device 110 may be a SIP-based telephone device that includes a display screen, a user interface that allows the users to enter information into user device 110, and one or more applications executed by processing logic included in user device 110. For example, user device 110 may be a SIP-based telephone that includes a calendar application and a web-browser for accessing the Internet. User device 110 may connect to network 160 and/or telephone device 120 via any conventional technique, such as wired, wireless, or optical connections.

Each of telephone devices 120 and 130 may include any device or combination of devices capable of transmitting voice signals and/or data to a network, such as network 160. In one implementation, telephone devices 120 and 130 may include any type of communication device, such as a plain old telephone system (POTS) telephone, a VoIP telephone (e.g., a SIP-based telephone), a wireless or cellular telephone device (e.g., a personal communications system (PCS) terminal that may combine a cellular radiotelephone with data processing and data communications capabilities, a PDA that can include a radiotelephone, or the like), etc.

Network device 140 may include one or more computing devices, such as one or more servers, computers, etc., used to receive information from other devices in network 100. For example, network device 140 may obtain information from a calendar application stored on one of user devices 110 or telephone devices 120 and 130, as described in detail below.

Conference bridge 150 may be a conventional conference bridge that links multiple parties in a teleconference or conference call. Conference bridge 150 may include and/or interact with various resources, such as telephone circuits, switching devices, software or hardware controlled devices, etc., involved in linking each of the respective parties into the teleconference.

Network 160 may include one or more wired and/or wireless networks that are capable of receiving and transmitting data, voice and/or video signals, including multimedia signals that include voice, data and video information. For example, network 160 may include one or more public switched telephone networks (PSTNs) or other type of switched network. Network 160 may also include one or more wireless networks and may include a number of transmission towers for receiving wireless signals and forwarding the wireless signals toward the intended destinations. Network 160 may further include one or more packet switched networks, such as an Internet protocol (IP) based network, a local area network (LAN), a wide area network (WAN), a personal area network (PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, network 100 may include additional elements, such as switches, gateways, routers, etc., that aid in routing traffic, such as telephone calls, from user device 110 and/or telephone devices 120 and 130 to their respective destinations in network 100. In addition, user device 110, telephone devices 120 and 130, network device 140 and conference bridge 150 are shown as separate devices in FIG. 1. In other implementations, the functions performed by two or more of these devices may be performed by a single device or platform. For example, in some implementations, the functions described as being performed by user device 110 and telephone device 120 may be performed by a single device, such as telephone device 120.

Figure 2:
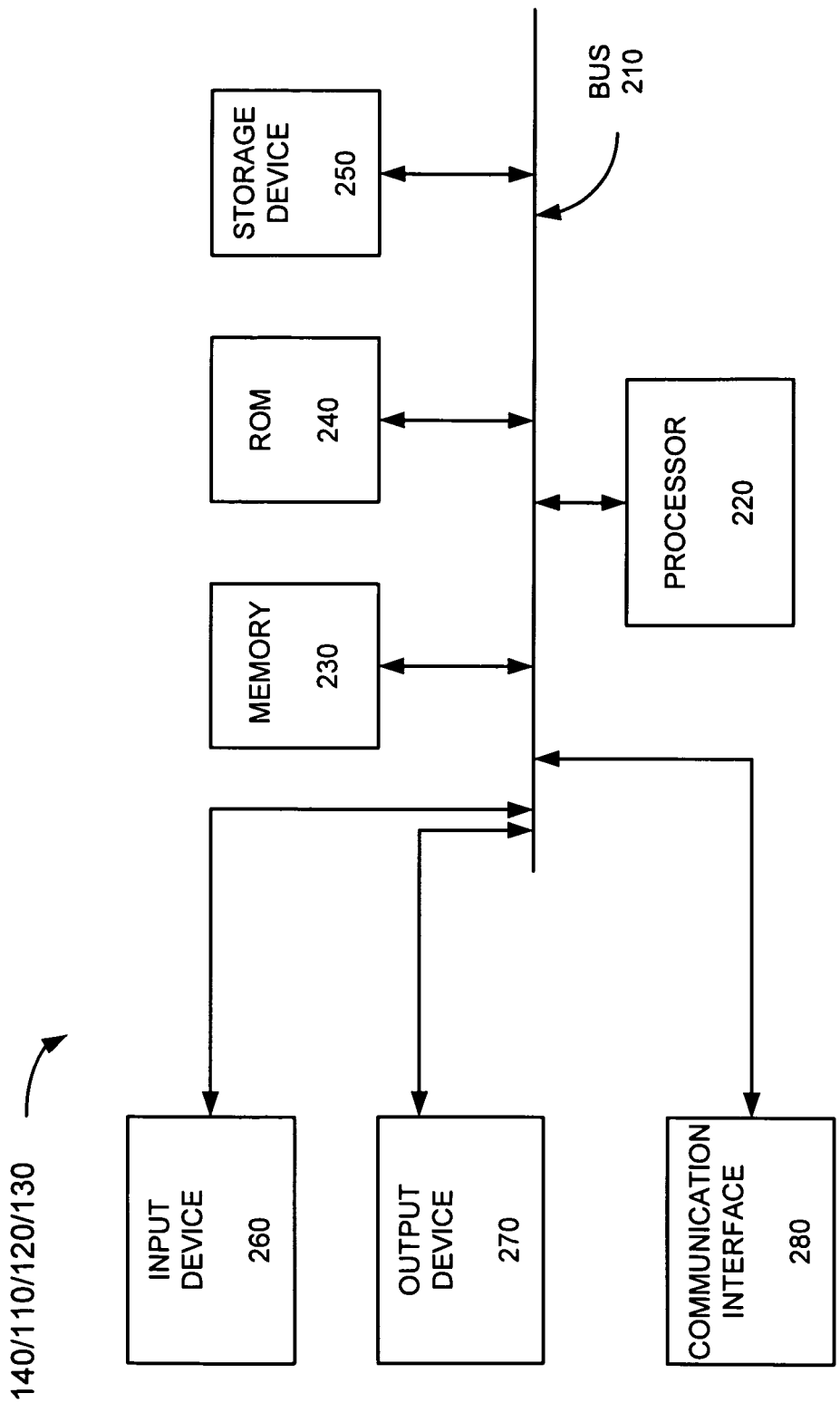
FIG. 2 illustrates an exemplary configuration of one or more of the devices of FIG. 1.

FIG. 2 is a diagram illustrating components of network device 140 according to an exemplary implementation. In some implementations, user device 110 and/or telephone devices 120 and 130 may be configured in a similar manner. Referring to FIG. 2, network device 140 may include bus 210, processor 220, main memory 230, read only memory (ROM) 240, storage device 250, input device 260, output device 270, and communication interface 280. Bus 210 may include a path that permits communication among the elements of network device 140. It should be understood that network device 140 may be configured in a number of other ways and may include other or different elements.

Processor 220 may include one or more processors, microprocessors, application specific integrated circuits (ASICs), field programmable gate arrays (FPGAs), or other processing logic that may interpret and execute instructions. Memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include one or more mechanisms that permit a user to input information to network device 140, such as a keyboard, a microphone, a touch screen, a mouse, a pen, voice recognition and/or biometric mechanisms, etc.

Output device 270 may include one or more mechanisms that output information to the user, including a display, such as a liquid crystal display (LCD), a printer, one or more speakers, etc.

Communication interface 280 may include any transceiver-like mechanism that enables network device 140 to communicate with other devices and/or systems. For example, communication interface 280 may include a modem or an Ethernet interface to a LAN for communicating with other devices in network 100 via, for example, network 160. Communication interface 280 may also include mechanisms for communicating via a network, such as a wireless network. In these implementations, communication interface 280 may include one or more radio frequency (RF) transmitters, receivers and/or transceivers and one or more antennas for transmitting and receiving RF data via network 160. Communication interface 280 may further include mechanisms for dialing and/or connecting telephone devices in network 100 to conference bridge 150 and/or each other. Alternatively, communication interface 280 may include other mechanisms for communicating via a network, such as network 160.

Network device 140 may provide a platform to facilitate the linking of parties in conference calls. Network device 140 may perform these operations in response to processor 220 executing sequences of instructions contained in a computer-readable medium, such as memory 230. A computer-readable medium may be defined as a physical or logical memory device. The software instructions may be read into memory 230 from another computer-readable medium, such as storage device 250, or from another device via communication interface 280. The software instructions contained in memory 230 may cause processor 220 to perform processes that will be described later. Alternatively, hard-wired circuitry may be used in place of or in combination with software instructions to implement processes consistent with the embodiments described herein. Thus, implementations described herein are not limited to any specific combination of hardware circuitry and software.

Figure 3:
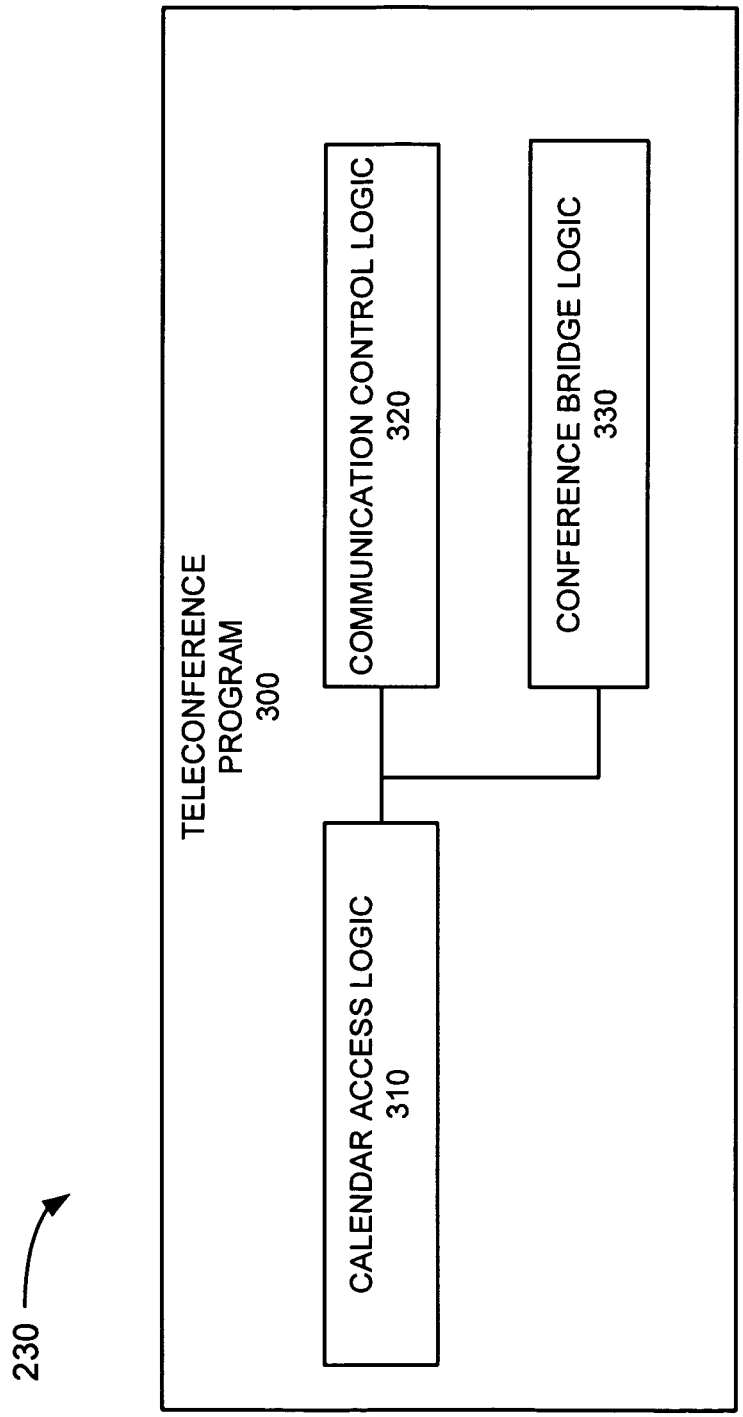
FIG. 3 illustrates an exemplary configuration of logic components implemented in the device of FIG. 2.

FIG. 3 is an exemplary functional block diagram of components implemented in network device 140 of FIG. 2, such as by processor 220 executing a program stored in memory. Referring to FIG. 3, a teleconference program 300 may be stored in memory 230. Teleconference program 300 may include a software program that extracts information from an application stored on a user device, which may include telephone functionality, or from a telephone device that includes various applications, such as a calendar application. Teleconference program 300 may then use this information to aid a user in being bridged or joined into a conference call.

In an exemplary implementation, teleconference program 300 may include calendar access logic 310, communication control logic 320 and conference bridge logic 330. Teleconference program 300 and its various logic components are shown in FIG. 3 as being included in network device 140. In alternative implementations, these components or a portion of these components may be located externally with respect to network device 140. For example, in some implementations, one or more of the components of teleconference program 300 may be located in user device 110 or telephone device 120.

Calendar access logic 310 may include logic to access applications, such as a calendar application. A calendar application, as the term is used herein, should be construed to include any standalone application that allows a user to enter information, such as notes, meeting information, deadlines, etc., at a particular time and date, or any other application, such as a messaging application (e.g., an email program) that includes calendar functionality that allows a user to keep track of various information based on time and date. Calendar access logic 310 may parse the information in a calendar application and attempt to identify information that corresponds to a telephone number, such as a conference bridge telephone number and/or a passcode for a conference bridge. Calendar access logic 310 may use this information to aid in automatically setting up a teleconference for a party at user device 110 or telephone device 120.

Communication control logic 320 may include logic that receives information from calendar access logic 310 and generates information associated with dialing into a conference bridge, such as conference bridge 150. In some implementations, communication control logic 320 may automatically perform the dialing and other tasks, such as entering a passcode, to link a telephone device to a teleconference supported by conference bridge 150.

Conference bridge logic 330 may include logic associated with establishing a conference call via a conference bridge. For example, various conference bridges require different information in order to be patched into the teleconference, such as different types of passcodes, user identifiers (IDs), as well as different procedures for linking into the teleconference. Conference bridge logic 330 may store rules associated with various different conference bridges to facilitate entry into a teleconference for a user.

As an example, assume that conference bridge 150 requires that after the telephone number of the conference bridge is dialed and a connection is established, a user is required to enter a passcode followed by the pound sign (i.e., #) to enter the teleconference. In this case, conference bridge logic 330 may include the information that the passcode must be followed by the pound sign. In other instances, another conference bridge may require that the user enter a star key (i.e., *) after the passcode. In each case, conference bridge logic 330 may identify particular rules based on the particular conference bridge being accessed for the teleconference. That is, conference bridge logic 330 may store the appropriate information with respect to accessing various different conference bridges.

Teleconference program 300 may provide users with the ability to link into a teleconference in an automated or semi-automated manner. In each case, teleconference program 300 may allow the user to join or enter a teleconference without having to physically remember and dial a telephone number and passcode, as described in detail below.

Figure 4A:
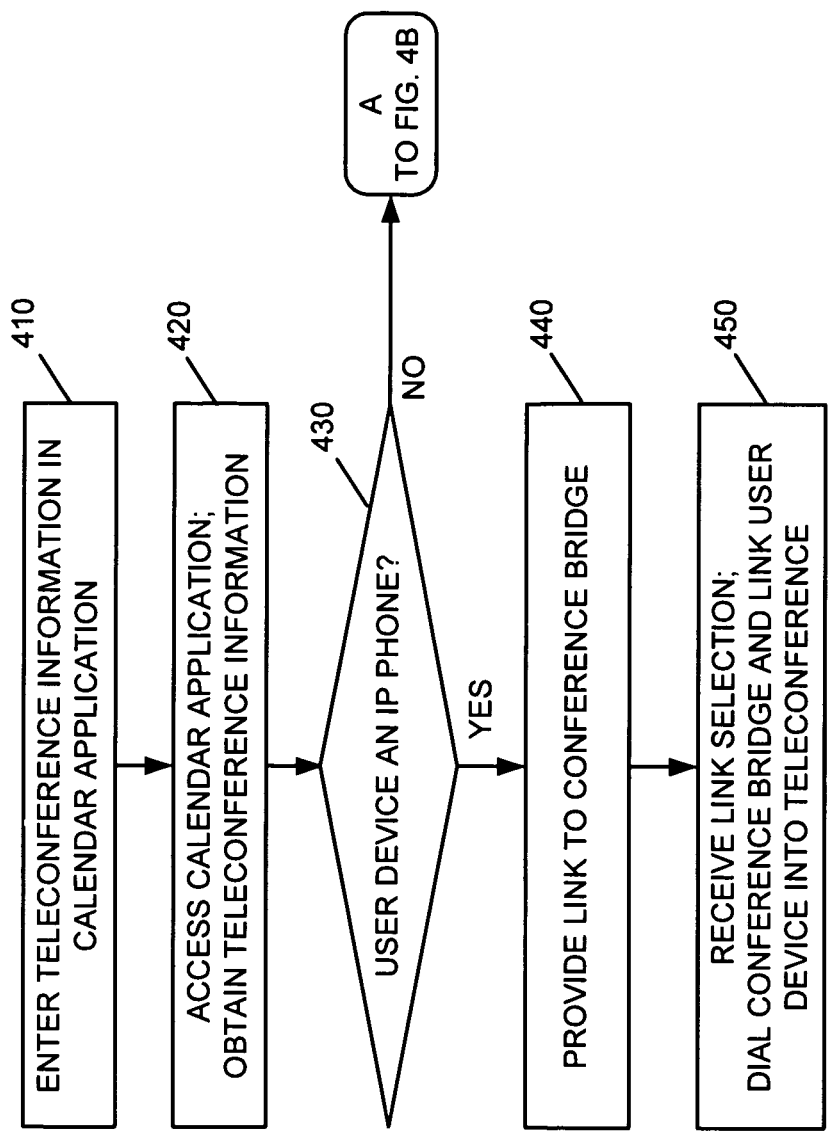
FIGS. 4A and 4B are flow diagrams illustrating exemplary processing by various devices illustrated in FIG. 1.
Figure 4B:
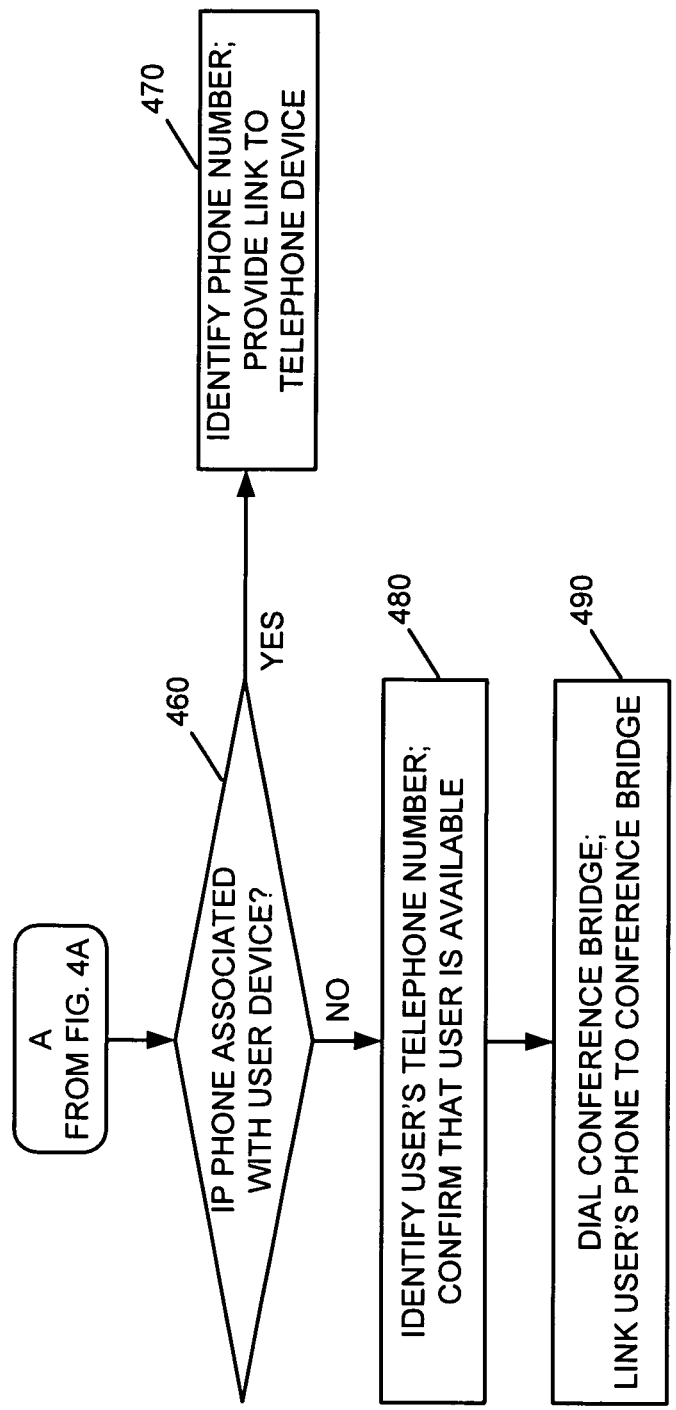

FIGS. 4A and 4B are flow diagrams illustrating exemplary processing associated with linking into a teleconference. Processing may begin with a party at user device 110 inputting information regarding an upcoming teleconference. For example, the party at user device 110 may enter a telephone number for a conference bridge and a passcode for the teleconference into a calendar application (act 410). The user may make the entry at a particular time and date corresponding to the date and time of the upcoming teleconference. For example, the user may enter the teleconference bridge number and passcode at an entry corresponding to November 10th at 10:00 AM.

Network device 140 may access the calendar application stored on user device 110 to obtain teleconference related information (act 420). For example, calendar access logic 310 may periodically access the calendar application stored on user device 110. Calendar access logic 310 may parse the information stored in the calendar application to attempt to identify a conference bridge number and/or a passcode associated with a conference bridge. For example, calendar access logic 310 may identify any seven or ten digit number with an accompanying number, such as a number including, for example, six or more digits that may be followed by the term "passcode," "pc," "identifier," "ID," etc., as corresponding to a conference bridge number and passcode for the conference bridge.

Assume that calendar access logic 310 identifies a conference bridge number and passcode for the teleconference on November 10th at 10:00 AM (act 420). Communication control logic 320 may obtain the conference bridge number and passcode from calendar access logic 310. Communication control logic 320 may also access conference bridge logic 330 to identify rules associated with the conference bridge that will be used. For example, assume that the obtained conference bridge number is associated with conference bridge 150. Further assume that one of the rules associated with conference bridge 150 requires that after the passcode is entered, the pound sign (i.e., #) is to be entered. In this case, conference bridge logic 330 may include the information that the passcode must be followed by the pound sign.

Communication control logic 320 may also determine whether user device 110 is an IP-based phone device (act 430). For example, communication control logic 320 may determine whether user device 110 is capable of accessing a packet-switched network, such as the Internet, and making and receiving phone calls, such as VoIP-based calls. In an exemplary implementation, communication control logic 320 may store a list of user devices in network 100 for which it provides services that are IP-based phones, such as SIP-based phones. For example, teleconference program 300 may be associated with a company in which the employees register to use teleconference program 300. In this instance, the users may register information regarding their telephone devices, such as type of phone, telephone number, etc. In other instances, teleconference program 300 may be associated with a service that is open to any users who register. In this case, the users may register their phone information, such as type of phone, phone number, etc.

If communication control logic 320 determines that user device 110 is an IP-based phone, communication control logic 320 may, for example, provide a link, such as a hyperlink to user device 110 (act 440). In an exemplary implementation, the hyperlink may include information that allows the user to be bridged into conference bridge 150.

For example, in one implementation, the hyperlink may link back to network device 140 or another network device that dials the appropriate conference bridge, enters the appropriate passcode on behalf of user device 110 and links user device 110 into the teleconference supported by conference bridge 150.

Assume that the user of user device receives the hyperlink and selects the link. Network device 140 (or another network device) may receive the communication associated with the link selection (act 450). Network device 140 may then dial the conference bridge number and passcode, followed by a particular symbol (e.g., the pound sign), if appropriate. Network device 140 may then dial the appropriate number for user device 110 and link user device 110 into the conference bridge (act 450).

If user device 110 is not an IP-based phone (act 430—no), communication control logic 320 may determine whether an IP-based phone is associated with user device 110 (act 460). For example, in some instances, a user's work area (e.g., cubicle, office, etc.) may include a PC, such as user device 110, and a telephone, such as telephone device 120. In such instances, network device 140 may have a list of telephone devices associated with each party, such as each worker in a company, department, locale, etc. Network device 140 may also store information indicating whether these telephone devices are IP-based devices.

In this example, if communication control logic 320 determines that telephone device 120 is affiliated with or associated with user device 110, and that telephone device 120 is an IP-based phone (act 460—yes), communication control logic 320 may identify a telephone number or address for telephone device 120 (act 470). Communication control logic 320 may also forward a hyperlink to telephone device 120 (act 470). The user at telephone device 120 may then select the hyperlink to be linked into the teleconference, as described above with respect to FIG. 4A. For example, in one implementation, the hyperlink may link back to network device 140 or another network device that dials the appropriate conference bridge, enters the appropriate passcode on behalf of telephone device 120 and links telephone device 120 into the teleconference supported by conference bridge 150.

If communication control logic 320 determines that there is no IP-based phone associated with user device 110 (act 460—no), communication control logic 320 may access a telephone number associated with telephone device 120. Once again, in some implementations, such as situations in which network device 140 is associated with a particular company or is associated with a service provided by a service provider, network device 140 may store telephone numbers associated with various parties that wish to utilize teleconference program 300, such as parties at user device 110 and telephone devices 120 and 130.

In each case, communication control logic 320 may identify the appropriate telephone number, such as the telephone number of telephone device 120 (act 480). In some instances, communication control logic 320 may call telephone device 120 prior to the teleconference time to determine whether the user is available for the teleconference (act 480). If the user at telephone device 120 does not respond or responds that he/she does not want to join the teleconference, communication control logic 320 may perform no further actions.

Assume that the user at telephone device 120 indicates that he/she is available and would like to join the teleconference, or that no confirmation regarding the user's availability is necessary. Network device 140 may then dial the conference bridge number for network bridge 150 and passcode for the teleconference (act 490). Network device 140 may also dial the telephone number for telephone device 120 and link telephone device 120 into conference bridge 150 (act 490). In this manner, the user at telephone device 120 is linked into the teleconference.

As described above, network device 140 may access a calendar application stored on a user device, such as user device 110 and facilitate a user joining or entering into a teleconference. In other implementations, telephone devices that include calendar applications may similarly be linked into teleconferences. For example, any telephone device, such as telephone device 130, may be linked into a teleconference in a similar manner. In situations where telephone device 130 is an IP-based device, a link may be provided to telephone device 130. In other instances, such as in situations where telephone device is a POTS phone, a cellular phone or other type of telephone device, network device 140 may place the call to conference bridge 150 on behalf of telephone device 130, enter the passcode and other information (e.g., a pound sign) and call telephone device 130 to link telephone device into the teleconference. In instances where a cell phone has Internet access, a link or some other type of alert, such as a text message, may be provided to the cell phone to allow the user to determine whether he/she would like to enter the teleconference prior to network device 140 performing additional tasks.

Network device 140 may aid in allowing any number of users to enter various teleconferences. In each case, network device 140 automates the processing needed to enter the teleconference. For example, one user device, such as user device 110, may be provided with a hyperlink via which access to the teleconference will be provided, whereas another user device, such as telephone device 130, may gain access to the same or different teleconference by network device 140 automatically dialing the appropriate telephone numbers and entering the appropriate information, without requiring the user to select a particular link.

Figure 5:
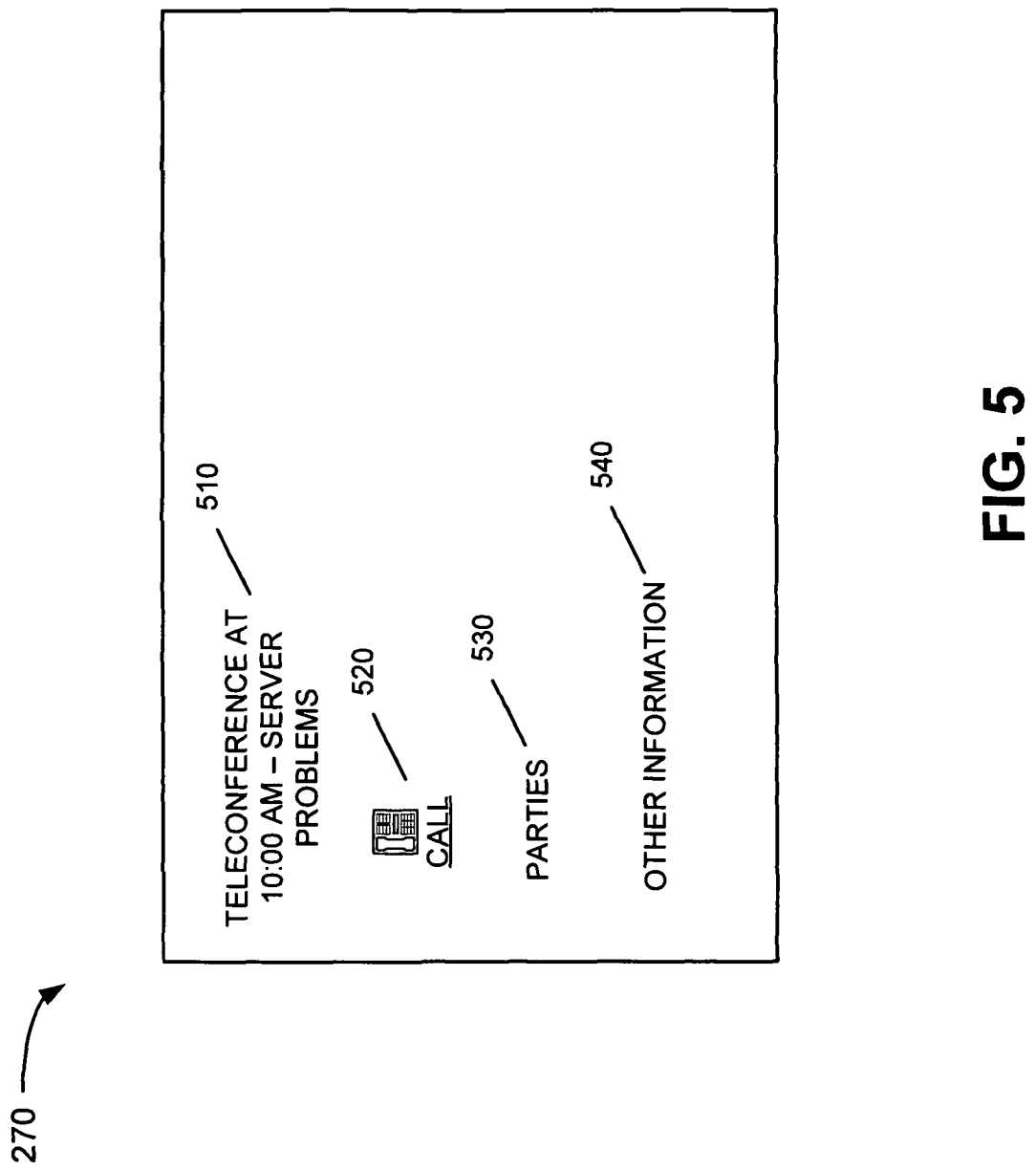
FIG. 5 is an exemplary display associated with the processing of FIGS. 4A and 4B.

In addition, in some implementations, the user at the particular telephone device may be provided with a hyperlink and possibly additional information associated with the teleconference. FIG. 5 illustrates an exemplary output device 270 associated with, for example, user device 110, telephone device 120 or telephone device 130. In this example, output device 270 may be a display screen of the particular device being used to access the teleconference. For example, assume that output device 270 is a display screen for user device 110, which is an IP-based phone that will be used to access a teleconference.

Referring to FIG. 5, various information is provided at areas 510-540. The information provided in FIG. 5 may be provided as an alert to a user of user device 110 at a predetermined time prior to the teleconference (e.g., 5 minutes, 15 minutes, etc., prior to the teleconference). Area 510 may include a notification regarding the upcoming teleconference that includes the time of the teleconference and a short topic or title associated with the teleconference (i.e., server problems in this example). The time information may be determined based on the time provided in the calendar application with respect to when the teleconference is to commence. In addition, the topic may be provided from a note that the user of user device 110 may have provided in the calendar entry for the teleconference. In this case, calendar access logic 310 may identify any information (e.g., note-like information) that accompany the teleconference bridge number and passcode.

Area 520 may include a telephone icon and a hyperlink labeled "call." As discussed above, the user may select this hyperlink labeled "call" at area 520 to initiate the processes described above with respect to joining the teleconference.

Area 530 may include further information associated with the teleconference, such as the parties associated with the teleconference. The particular parties in the teleconference may be obtained by network device 140, for example, by comparing information it has received from other telephone devices indicating the same conference bridge number, passcode and time for the teleconference. Alternatively, calendar access logic 310 may extract teleconference participant information from notes provided by the user of user device 110 in the calendar entry associated with the teleconference.

Area 540 may include additional information associated with the teleconference. For example, other information may include snippets of information associated with the subject of the teleconference. This information may be obtained by accessing any notes that the user may have provided in the calendar entry associated with the teleconference. Alternatively, calendar access logic 310 may have access to other applications stored on user device 110 and obtain information regarding the topic of the teleconference by searching these other applications/files. For example, in the example illustrated in FIG. 5 in which the topic of the teleconference is "server problems," calendar access logic 310 may search the user's files, emails, etc., for this term and retrieve information that may be relevant to the teleconference. This information may be provided at area 540, and/or snippets, identifiers or links to this information may be provided at area 540. Viewing this other information or having quick access to this other information may allow the user at user device 110 to easily prepare for the teleconference.

Implementations described above refer to teleconference program 300 being used to aid a user in joining a teleconference. In other instances, teleconference program 300 may be used to initiate any appointment-related call. For example, the party at user device 110 may store a telephone number in a calendar entry for November 15 at 4:00 PM. In this case, calendar access logic 310 may identify the telephone number in a similar manner as described above. Communication control logic 320 may receive this information and provide a link to user device 110 shortly before 4:00 PM on November 15th. When the user selects the link, network device 140 may automatically dial the telephone number on behalf of the user at user device 110 and dial the user's telephone number to establish the telephone call between the two parties. Alternatively, network device 140 may automatically dial the telephone number on behalf of the user at user device 110 at 4:00 PM on November 15th and dial the user's telephone number to link the two parties, without requiring the user to select a link. In this manner, teleconference program 300 can be used to initiate any appointment-related call, such as a simple one-to-one call.

Implementations described herein facilitate users bridging into teleconferences or making other appointment-related calls by automating all or some of the processes associated with teleconferencing and/or calling. By eliminating the need for a user to remember various information, such as conference bridge telephone numbers, other parties' telephone numbers, passcodes/IDs, particular rules associated with joining teleconferences, etc., the user is provided with an easy way to establish contact with other parties.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to linking into a teleconference that utilize a conference bridge. In an alternative implementation, a call to one or more other parties can be made via network device 140 without requiring the use of a conference bridge. For example, some telephone devices/systems may allow the user to create a teleconference with multiple parties by using one or more special features of the telephone device/system. In such implementations, teleconference program 300 may store the appropriate information to allow the user to link one or more other parties into the conference call.

Further, in some implementations, teleconference program 300 may be used to initiate other types of appointment-related communications. For example, teleconference program 300 may be used to initiate text-based communication sessions, such as instant messaging (IM) sessions, email communications, etc. In these implementations, teleconference program 300 may perform the necessary background processes, such as launch the application on the user's device, open a window displaying the text-based application, etc., at the appropriate time based on an entry stored in a calendar application.

In addition, features have been described above in which a network device (e.g., network device 140) used to facilitate the teleconference or other communication is located externally with respect to the telephone device that will be involved in the communication session. In other instances, the telephone device may store teleconference program 300. For example, in other instances, user device 110, telephone device 120 and/or telephone device 130 may each store teleconference program 300. In these instances, the particular telephone device may perform some or all of the processing described above to facilitate a communication session, without having to interact with an external device, such as network device 140.

Further, while series of acts have been described with respect to FIGS. 4A and 4B, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:

accessing, by a network device, a calendar application stored on a first user device;

identifying, by the network device, first information, stored in the calendar application, that is associated with a teleconference utilizing a conference bridge;

accessing, by the network device, at least one of files or applications stored on the first user device;

identifying, by the network device and within the accessed at least one of files or applications, second information relevant to the teleconference;

accessing, by the network device, calendar applications stored on a plurality of other user devices;

identifying, by the network device and based on information obtained from the calendar applications stored on the other user devices, a plurality of parties associated with the teleconference;

forwarding, by the network device and to the first user device, a hyperlink via which the first user device can be entered into the teleconference;

forwarding, by the network device and to the first user device, at least some of the second information or at least one link to at least some of the second information; and providing, for output by the first user device and at a predetermined time before the teleconference, a notification screen including information identifying a time and topic associated with the teleconference, the hyperlink, information identifying the plurality of parties associated with the teleconference and at least one of some of the second information or the at least one link to at least some of the second information.

2. The method of claim 1, further comprising:

receiving a communication associated with selection of the hyperlink by a user at the first user device;

automatically dialing a telephone number of the conference bridge and inputting a passcode or other identifier to the conference bridge;

automatically dialing a telephone number of the first user device; and linking the first user device into the teleconference.

3. The method of claim 1, wherein the identifying first information comprises:

identifying a conference bridge telephone number and an identifier or code for the teleconference.

4. The method of claim 1, further comprising:

forwarding third information associated with the teleconference with the hyperlink to the first user device, the third information including the time and the topic associated with the teleconference.

5. The method of claim 1, further comprising:

accessing a calendar application stored on a second user device;

identifying information, stored in the calendar application on the second user device, that is associated with the teleconference utilizing the conference bridge;
automatically dialing a telephone number of the conference bridge;
automatically entering a passcode or identifier associated with the teleconference;
automatically dialing a telephone number of the second user device; and
linking the second user device into the teleconference.

6. The method of claim 5, further comprising:
determining whether a party at the second user device wishes to be included in the teleconference prior to dialing the telephone number of the conference bridge.

7. The method of claim 6, wherein the determining comprises:
transmitting a communication associated with the teleconference to the second user device, and
determining whether the party wishes to be included in the teleconference based on a response or lack of a response to the communication.

8. The method of claim 1, further comprising:
forwarding, to the first user device, information identifying the parties associated with the teleconference.

9. The method of claim 1, wherein the method is implemented using a computer-readable medium.

10. A non-transitory computer-readable medium having stored thereon sequences of instructions which, when executed by at least one processor, cause the at least one processor to:
identify first information, stored in a first user device, that is associated with a teleconference utilizing a conference bridge;
access at least one of files or applications stored on the first user device;
identify, within the accessed at least one of files or applications, second information relevant to the teleconference;
access calendar applications stored on a plurality of other user devices;
identify, based on information obtained from the calendar applications stored on the plurality of other user devices, a plurality of parties associated with the teleconference;
forward, to the first user device, a hyperlink via which the first user device can be linked into the teleconference and at least some of the second information or a link to at least some of the second information; and
provide, for output at the first user device and at a predetermined time before the teleconference, a notification screen identifying a time and topic for the teleconference, the hyperlink, the plurality of parties associated with the teleconference and at least one of some of the second information or the at least one link to at least some of the second information.

11. The non-transitory computer-readable medium of claim 10 further including instructions for causing the at least one processor to:
receive a communication associated with selection of the hyperlink by a user at the first user device;
automatically dial a telephone number of the conference bridge and input a passcode or other identifier to the conference bridge;
automatically dial a telephone number of the first user device; and
link the first user device into the teleconference.

12. The non-transitory computer-readable medium of claim 10, wherein when identifying first information, the instructions cause the at least one processor to:
identify a conference bridge telephone number and an identifier or code, for the teleconference, in a calendar application stored on the first user device.

13. The non-transitory computer-readable medium of claim 12, wherein when identifying first information, the instructions further cause the at least one processor to:
identify the topic and the plurality of parties based on information stored in the calendar application; and
forward the topic and information identifying the plurality of parties to the first user device.

14. The non-transitory computer-readable medium of claim 10, further including instructions for causing the at least one processor to:
determine whether a party at the first user device wishes to be included in the teleconference prior to linking the first user device into the teleconference.

15. The non-transitory computer-readable medium of claim 10, further including instructions for causing the at least one processor to automatically dial the conference bridge and a second user device to link the second user device to the teleconference.

16. A device, comprising:
a communication interface configured to communicate with a plurality of user devices; and
logic configured to:
identify first information stored in a calendar application associated with a first one of the plurality of user devices, the first information including a conference bridge telephone number and a passcode or identifier for entering a teleconference,
forward, to the first user device via the communication interface, a first link via which the first user device can be linked into the teleconference,
identify, within at least one of files or applications stored on the first user device, second information relevant to the teleconference,
forward, to the first user device, at least some of the second information or at least one second link to at least some of the second information,
access calendar applications stored on other ones of the plurality of user devices,
identify, based on information obtained from the calendar applications stored on the other ones of the plurality of user devices, a plurality of parties associated with the teleconference, and
forward, to the first user device, information identifying the plurality of parties.

17. The device of claim 16, wherein the logic is further configured to:
receive, via the communication interface, a communication associated with selection of the first link by a user at the first user device,
automatically dial the conference bridge telephone number, and
automatically input the passcode or identifier.

18. The device of claim 17, wherein the logic is further configured to:
automatically dial a telephone number of the first user device, and
link the first user device into the teleconference.

19. The device of claim 16, wherein the logic is further configured to:
identify information stored in a calendar application associated with a second one of the plurality of user devices, the information including the conference bridge telephone number and the passcode or identifier for entering the teleconference, automatically dial the telephone number of the conference bridge on behalf of the second user device, automatically enter the passcode or identifier on behalf of the second user device, automatically dial a telephone number of the second user device, and link the second user device into the teleconference.

20. A method, comprising:

identifying first information stored in an application on a first user device, the first information being associated with an appointment-related call;

identifying a topic associated with the appointment-related call;

searching the first user device, based on the identified topic, for second information relevant to the appointment-related call;

identifying, based on information obtained from calendar applications associated with other user devices, a plurality of parties associated with the appointment-related call;

forwarding a first link to the first user device via which a communication session with a second user device can be established;

forwarding, to the first user device, at least some of the second information or at least one second link to at least some of the second information; and providing, for output by the first user device and at a predetermined time before the appointment-related call, a notification screen including information identifying the time and topic associated with the teleconference, the first link, information identifying the plurality of parties that are participating in the appointment-related call, and at least one of some of the second information or the second link.

21. The method of claim 1, wherein the identifying second information comprises:

identifying the topic associated with the teleconference, and searching the at least one of files or applications based on the identified topic to identify the second information.

22. The method of claim 1, wherein the identifying a plurality of parties associated with the teleconference comprises:

comparing the information obtained from calendar applications stored on the other user devices to a conference bridge number, passcode or identifier to join the teleconference and a time associated with the teleconference.

* * * * *